(12) United States Patent
Schenk et al.

(10) Patent No.: US 7,448,807 B2
(45) Date of Patent: Nov. 11, 2008

(54) SEAL

(75) Inventors: Rainer Schenk, Fürth (DE); Ralph Painta, Hagenbüchach (DE)

(73) Assignee: Schaeffler KG, Herzogenaurach (DE)

( * ) Notice: Subject to any disclaimer, the term of this patent is extended or adjusted under 35 U.S.C. 154(b) by 347 days.

(21) Appl. No.: 10/567,053

(22) PCT Filed: Jul. 24, 2004

(86) PCT No.: PCT/EP2004/008304

§ 371 (c)(1),
(2), (4) Date: Feb. 2, 2006

(87) PCT Pub. No.: WO2005/019669

PCT Pub. Date: Mar. 3, 2005

(65) Prior Publication Data

US 2006/0188191 A1    Aug. 24, 2006

(30) Foreign Application Priority Data

Aug. 19, 2003   (DE) .................... 103 38 530

(51) Int. Cl.
*F16C 33/76* (2006.01)
*F16H 55/00* (2006.01)

(52) U.S. Cl. ............... 384/489; 384/486; 384/477; 384/417

(58) Field of Classification Search ........... 384/448, 384/482–486, 489, 546; 277/267, 353, 549, 277/637; 474/135, 199; 464/131
See application file for complete search history.

(56) References Cited

U.S. PATENT DOCUMENTS

| | | | | |
|---|---|---|---|---|
| 3,519,316 A * | 7/1970 | Gothberg | ............... | 277/367 |
| 4,025,132 A * | 5/1977 | Watanabe | ............... | 384/130 |
| 5,026,324 A * | 6/1991 | Schurger et al. | ............... | 464/131 |
| 5,449,328 A * | 9/1995 | Schmidt et al. | ............... | 474/135 |
| 5,704,719 A * | 1/1998 | Cook et al. | ............... | 384/484 |
| 5,711,616 A * | 1/1998 | Gassmann et al. | ............... | 384/482 |
| 6,241,257 B1 * | 6/2001 | Hauck et al. | ............... | 277/637 |
| 6,357,926 B1 * | 3/2002 | Hauck et al. | ............... | 384/546 |
| 6,394,247 B1 * | 5/2002 | Monahan et al. | ............... | 192/41 S |
| 6,854,893 B2 * | 2/2005 | Schmidt | ............... | 384/486 |
| 7,011,593 B2 * | 3/2006 | Schenk et al. | ............... | 474/199 |
| 7,147,379 B2 * | 12/2006 | Ohtsuki et al. | ............... | 384/448 |

FOREIGN PATENT DOCUMENTS

| | | |
|---|---|---|
| DE | 953597 C | 12/1956 |
| DE | 3514203 C1 * | 7/1985 |
| DE | 4133777 A1 | 4/1993 |
| DE | 10061995 A1 | 6/2002 |
| DE | 10209673 A | 9/2003 |

* cited by examiner

*Primary Examiner*—Marcus Charles
(74) *Attorney, Agent, or Firm*—Lucas & Mercanti, LLP

(57) ABSTRACT

A seal for a pulley on a roller bearing includes a sealing cap which covers the front face of the roller bearing and is connected to a hub for externally enclosing the roller bearing. On the opposite side, the roller bearing has a sealing plate, which is likewise fixed to the hub and on the inner side interacts with a cylindrical section of the fixed housing.

26 Claims, 3 Drawing Sheets

SEAL

FIELD OF THE INVENTION

The present invention relates to the seal for a roller bearing, the seal comprising a sealing plate and/or a sealing cap and being assigned to a hub, which externally encloses the roller bearing. The sealing cap is designed to cover the front face of the roller bearing. On the inner side, on the other hand, the sealing plate is joined to a cylindrical section of a fixed housing, on which an inner bearing ring of the roller bearing is positioned.

BACKGROUND OF THE INVENTION

The working and the service life of the roller bearing is determined, in particular, by the quality of the seal. Vehicle manufacturers call for roller bearings, for belt drives of the internal combustion engine, for example, to be designed for the life of the vehicle.

Patent specification DE 41 33 777 C2 discloses a seal for a roller bearing, which is integrated into a tensioning roller of a belt drive. On both sides of the rolling elements the known seal comprises sealing plates, which are positioned on the rotating outer bearing ring and which on the inner side rub on the supporting inner bearing ring. Such a seal affords the roller bearing limited protection against splash water and the ingress of contaminants into the roller bearing, and provides a lubricant outlet from the roller bearing. This known seal is unsuitable, for example, for vehicles used in off-road operation, which are designed for running through water and which are exposed to massive ingress of dirt into the space provided for installation of the internal combustion engine.

One known measure designed to improve the sealing properties of roller bearing seals are covers which serve to partially cover the front face of the roller bearing. DE 953 597, for example, shows a seal which comprises two separate, elastic seals, the seal lips of which rub on a supporting sleeve enclosing the shaft. Two cover/sealing plates arranged separately from one another are furthermore placed in front of these seals. On the outside, a cover plate fixed to the housing is provided, through the central opening in which the shaft is led. A second rotating sealing plate is fixed in position on the shaft. The structure of this known seal for a roller bearing requires a large overall axial length and with two seal lips designed to rub furthermore generates a lot of heat, which has a detrimental effect on the service life of the roller bearing.

SUMMARY OF THE INVENTION

In view of the disadvantages of the known solutions, the object of the invention is to provide a roller bearing seal of compact design, which affords good sealing properties with no detrimental frictional heat, and which is inexpensive to produce.

The aforementioned object is achieved by utilizing a seal for a roller bearing having a sealing plate or cap attached to a rotating hub.

In one embodiment, the present invention includes as seal a sealing plate which is fixed at least with a positive interlock to the rotating hub, which externally encloses the roller bearing. For this purpose a separate sealing medium, which effectively seals a sealing gap formed between the sealing plate and the hub, is provided between these components. When the sealing plate is fitted, the elastic seal lip or the separate sealing medium is tightly joined to the housing. For this purpose the sealing plate on the inner side in the area of the central opening has an elastic seal lip or a separate sealing medium, which serves to seal the annular gap between the rotationally fixed housing and the sealing plate. The elastic seal at least is advantageously designed so that a bracing force of the rotating elastic seal fixed in position on the hub diminishes as the rotational speed increases. This principle decisively reduces the heat generated by the seal and improves the service life of the roller bearing.

In another embodiment, the present invention comprises a sealing cap, which is secured both by positive interlock and by force-locking to the rotating hub enclosing the outer bearing ring. The sealing cap extends over the entire front face of the roller bearing. A separate elastic sealing medium is provided, in order to seal off a sealing gap formed between the sealing cap and the hub.

The two sealing concepts according to the invention are particularly suited to the sealing of a roller bearing, which is intended for a taper bore mounted component. The sealing plate according to the invention is in this case arranged between the hub and the rotationally fixed housing and the sealing cap is arranged on the opposite side of the roller bearing. The sealing cap completely covers the front face of the roller bearing, including the threaded connection necessary for fixing the taper bore mounted component or the roller bearing.

Outstanding features of both seals according to the invention are their good sealing properties and compact design construction. The design of these seals furthermore makes them inexpensive to manufacture and easy to assemble. The sealing plate according to the invention is also designed in connection with the inner seal, so that if any bracing force occurs it diminishes as the rotational speed increases. This is accompanied by a decisive reduction in the frictional heat, which has a positive effect on the service life of the roller bearing.

The dvantageous developments of the present invention, together with other important aspects thereof, will be further appreciated upon reading the detailed description in conjunction with the drawings.

The seals according to the invention can be used to advantage for roller bearings of return pulleys, belt tensioning pulleys or tensioning pulleys or belt pulleys in general, which are intended for belt drives of internal combustion engines. The sealing property achievable with the seals according to the invention improves the maintainability and allows vehicles to run through water whilst resisting any major ingress of dirt. The seals according to the invention also allow belt drives, the assemblies and components of which include pulleys on roller bearings, to be used under water for limited periods.

To improve the efficiency of the seal according to the invention it is proposed that the sealing plate or sealing cap according to the invention should be combined with seals generally used on roller bearings, in order to obtain a two-stage roller bearing seal. Rotationally fixed seals or sealing elements, which are generally fixed directly in position, particularly to the outer bearing ring, and which either with a seal lip rubbing under a slight bracing force or whilst maintaining a seal gap are assigned to a rotationally fixed inner bearing ring, for example, are usually assigned to the roller bearings. These known sealing elements used between the bearing rings and thereby integrated in the roller bearing constitute a first sealing stage, which combined with the seal according to the invention that is placed in front, form a two-stage seal.

The design of the sealing cap and the sealing plate according to the invention means that these components are provided externally with axially protruding rims spread over at least part of the periphery. These rims arranged at right angles to the sealing cap and the sealing plate are provided for fixing to the hub, which externally encloses the roller bearing. For fixing the sealing plate and the sealing cap, the rims in certain areas advantageously grip over the hub, which externally encloses the roller bearing. The hub is integrally joined via a central member to a radially spaced bearing surface to form a pulley preferably made from plastic material. The elastically formed rims are designed so that a hub diameter exceeds the inside diameter of the rims, with the result that when fitted the sealing plate and the sealing cap are fixed to the hub by force-locking.

The invention also encompasses a positively interlocking connection as a supplement and/or alternative to a force-locking connection. For this purpose the rim is provided on the inside with at least one bead, which when fitted snaps positively into an associated annular groove in the hub. Where necessary, the rim may be provided with multiple beads axially separated from one another, which match annular grooves correspondingly let into the hub.

In order to achieve an optimum seal between the sealing cap and the hub and between the sealing plate and the hub, the invention provides for a separate elastic seal. A circular rubber ring or an O-ring, which when fitted rests on the front face of the hub and the base of the sealing cap or sealing plate, is particularly suitable as seal. Externally the separate seal is carried by the cylindrical, axially projecting rim of the sealing cap or the sealing plate.

In order to obtain a defined fitting position of the elastic seal, the invention furthermore encompasses a fitting space. Radially, this is defined externally by the rim and internally by a step, designed to form an axially aligned fitting space, which is intended to accommodate the elastic seal.

The fitting space is advantageously provided with a centrally arranged, circumferential spur, on which the seal is supported. In the fitted position the axially projecting spur, rounded at the end, positively interlocks in the seal. The small contact area between the spur and the seal means that even in unfavorable tolerance situations the spur can penetrate far enough into the seal to achieve an adequate sealing property.

The invention preferably encompasses sealing plates and sealing caps made from plastics, an inexpensive injection molding process being particularly suitable for large quantities. Alternatively the sealing plate and the sealing disc lend themselves to manufacturing from a metal by a deep-drawing process.

A preferred development of the invention relates to the design of the elastic seal on the inside in the area of the central opening in the sealing plate. The seal lip of this seal is in this case provided at the end with an external bead, which forms an additional mass. For this purpose the bead is arranged so that a centrifugal force acting at the center of mass of the bead gives rise to a component force, which continuously lifts off from the supporting face as the rotational speed increases. This serves to reduce the bracing force or the contact force of the seal lip on the associated cylindrical section of the housing. This measure produces a good sealing property when the internal combustion engine is at rest, in that the seal lip bears on the corresponding contact face with maximum bracing force. When the seal is rotating, that is to say when the internal combustion engine is running, for example, the centrifugal force causes the bracing force of the seal lip to diminish continuously as the rotational speed increases. The seal lip of beaded design serves to exert a direct influence on the working of the seal. In particular, the bearing force of the seal lip can be influenced by the mass of the bead and the axial distance of the bead from the radial flank or a center of rotation of the seal lip. The displacement of the seal lip under centrifugal force has the advantage that in the operating state, especially at high rotational speeds, the rubbing contact that occurs between the seal lip and the associated contact face is reduced to the extent that there is no detrimental friction associated with the generation of heat. With the internal combustion engine and the roller bearing at rest, on the other hand, a good sealing property occurs which will, for example, pass even an extreme test, complete immersion in a water bath.

According to the invention, in a further development of the sealing plate the seal lip provided with a bead can be arranged both axially outwards and axially inwards, that is to say in the direction of the roller bearing. Depending on the arrangement of the seal lip, the centrifugal force gives rise to a largely circular motion acting in a clockwise or counterclockwise direction, about the point of articulation or center of rotation of the seal lip.

For a sealing plate, the seal lip of which is arranged axially protruding with a bead, the seal lip in the fitted position may engage in an axial annular groove of the fixed housing. In addition to a protected fitting position for the seal lip, the outside wall of the annular groove at the same time serves to limit the displacement travel of the seal lip under centrifugal force.

The seal lip is advantageously fixed as a separate component to the radially inward facing flank of the sealing plate. For this purpose the seal lip preferably has an outer, circumferential annular groove, into which the flank of the sealing plate positively interlocks. Alternatively the invention encompasses a seal lip molded directly onto the flank of the sealing plate made from plastics.

In a further development of the invention an elastic medium is provided as seal between the end section of the radially inward facing flank of the sealing plate and a cylindrical section of the rotationally fixed housing. The elastic medium fills an annular gap, which is formed between the free end of the flank of the sealing plate and the cylindrical section of the housing. An annular element, filled with the elastic medium and having a U-shaped cross-sectional profile, into which the flank end of the sealing plate fits, lends itself to this purpose.

The radial flank of the sealing plate is preferably bent off at right angles at the end to form an axially projecting cylindrical rim. When fitted, the rim advantageously engages with some free play in an axial annular grove of the housing. The annular groove is here filled with the elastic medium, the characteristic of which after a short operating time ensures a largely contact-free bearing between the rim and the elastic medium. This serves to avoid any detrimental heating of the elastic medium, which might result in failure of this seal and on the other hand to detrimental heating of the roller bearing.

The axial rim of the sealing plate in conjunction with the elastic medium advantageously forms a seal labyrinth, which regardless of the operating condition of the internal combustion engine effectively prevents moisture or dirt getting into the roller bearing.

In a development of the axially projecting rim connected to the sealing plate, the rim is internally of cylindrical design shape and externally of conical design shape. When manufacturing the sealing plate by an injection molding process, this structure permits a desired flash-free, conical contact zone for the rim, which has an advantageous effect on the interaction with the elastic medium.

According to the invention a lubricant in accordance with the American Petroleum Institute Service Symbol SF 507 or the Designation of Lubricants Standard DIN 51502 KE 2 K-10 or DIN 51502 KE 3 K-10 as are commonly known in the art is preferably used as elastic medium. The code designation in accordance with DIN 51502 provides information about the type of lubricating grease. the suitability, consistency classes and the application temperature range of lubricants commercial grease products conforming to these trade standards are available under various trademarks. However, the invention is not limited to this but likewise encompasses other suitable alternative elastic media.

BRIEF DESCRIPTION OF THE DRAWINGS

The invention will be explained in more detail with reference to drawings representing three different exemplary embodiments and in which.

DETAILED DESCRIPTION OF THE DRAWINGS

Figure 1:
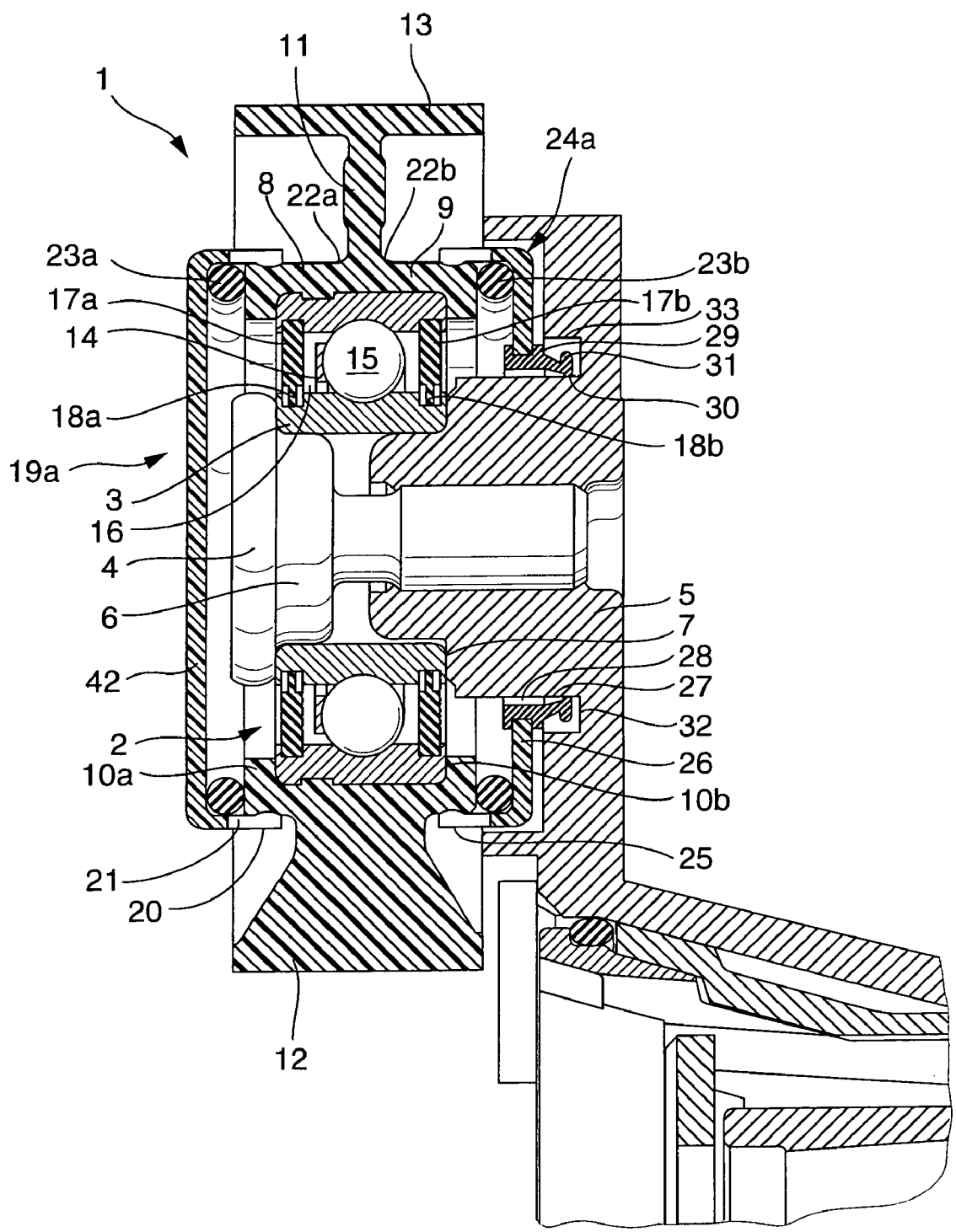
FIG. 1 shows the structure of a seal according to the invention for a roller bearing, the seal comprising a sealing cap and a sealing plate.

FIG. 1 shows a sectional representation of a taper bore mounted pulley 1, in which a roller bearing 2 is incorporated. An inner bearing ring 3 is here rotationally locked to a fixed housing 5 and its position fixed by means of a threaded connection 4. The inner bearing ring 3 is centered on a centering spigot 6 of the threaded connection 4 and is supported on a shoulder 7 of the housing 5. An outer bearing ring 8 is enclosed by a hub 9, the outer bearing ring 8 being fixed in position to radially inward facing shoulders 10a, 10b. The hub 9 is connected by way of a central wall 11 and circumferentially distributed members 12 to a rotating disc 13, on the circumferential surface of which a belt is guided when the pulley 1 is fitted. The rotating disc 13 together with the hub 9 forms one component, which is advantageously made as an injection molded part, the roller bearing 2 being externally coated as an imbedded part in the manufacturing process. Between the bearing rings 3 and 8 rolling elements 15 are carried in a cage 14, an internal space 16 of the roller bearing 2 partially filled with a lubricant having seals 17a, 17b on both sides. The seals 17a, 17b each rotationally locked in position in the outer bearing ring 8 are supported by seal lips 18a, 18b on the inner bearing ring 3.

In order to obtain a two-stage sealing of the roller bearing 2, the pulley 1 on the outside has a sealing cap 19a, which being of cup-shaped design externally encloses axially projecting rims 20 bent off at right angles. With the sealing cap 19a fitted, the rims 20, each arranged separately through slots 21, rest non-positively on a cylindrical step 22a of the hub 9. The sealing cap 19a, extending over the entire front face of the roller bearing 2 including the threaded connection 4 is advantageously made from a plastic material, thereby affording a weight advantage on the one hand and simplified assembly on the other. As an additional measure to improve the sealing of the sealing cap 19a, a seal 23a is provided, which with the sealing cap 19a fitted is supported between the hub 9 and the base 42 of the sealing cap and is externally enclosed by the rim 20. An elastic circular rubber ring, which when the sealing cap 19a is fitted is deformed and ensures an effective seal between the hub 9 and the sealing cap 19a, is preferably provided as seal 23a.

On the side facing the housing 5 the roller bearing 2 is provided with a sealing plate 24a, which matching the sealing cap 19a is forced over the rim 25 fixing it to the shoulder 22b of the hub 9. A seal 23b is furthermore positioned between the sealing plate 24a and the front face of the hub 9. The sealing cap 19a forms a radially inward facing flank 26, which is guided up to the cylindrical section 27 of the housing 5, maintaining an annular gap 28. On the inner side the flank 26 of the sealing plate 24a is provided with an elastic seal 29, which is snapped onto the flank 26 of the sealing plate 24a, which can alternatively be molded onto the flank 26. The seal 29 is supported on the cylindrical section 27 of the housing 5 by a seal lip 30.

At the free end the seal lip 30 is externally provided with a bead 31, which forms an additional mass of the seal lip 30. The bead 31 causes the bracing force of the seal lip 30 to diminish as the rotational speed of the pulley 1 increases. The centrifugal force acting at the center of mass of the bead 31 gives rise to a displacement travel of the seal lip 30 acting in the direction of the arrow, that is to say clockwise, originating from the cylindrical section 27 of the housing 5. As the rotational speed of the pulley 1 increases, the bracing force of the seal lip 30 thereby advantageously diminishes, accompanied by a simultaneous reduction of any frictional heating of the housing 5 and of the roller bearing 2 connected thereto. The seal lip 30 engages in an annular groove 32 in the housing 5, an outer wall 33 of the annular groove 32 representing a displacement travel limit of the seal lip 30, which as the rotational speed of the roller bearing 2 increases is displaced in a clockwise direction up to the outer wall 33.

Figure 2:
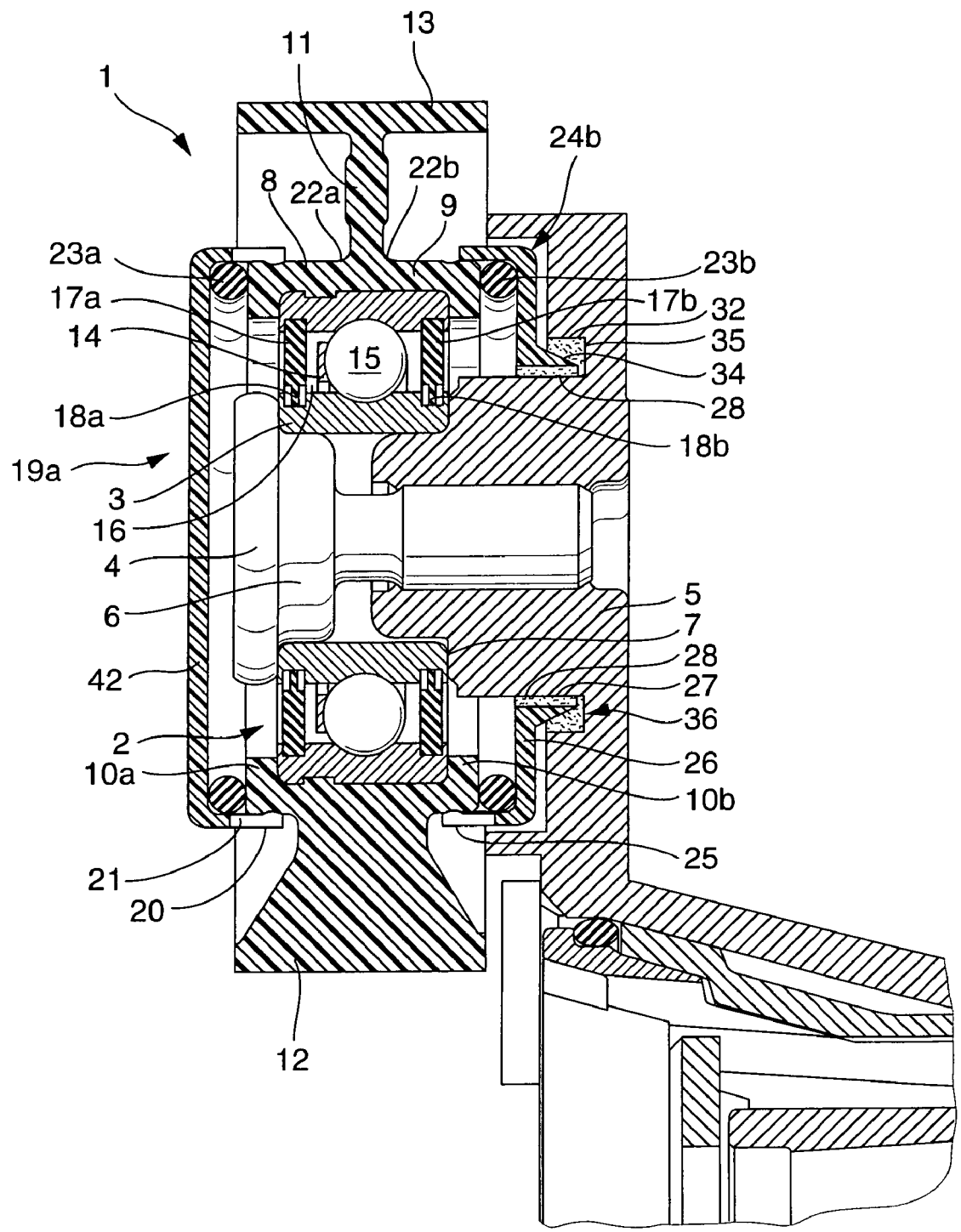
FIG. 2 shows a seal in which, in contrast to FIG. 1, the sealing plate is sealed to the housing by way of a sealing medium.

FIG. 2 shows the pulley 1, the sealing plate 24b of which is of different design to the sealing plate 24a according to FIG. 1. Adjoining the radial flank 26 of the sealing plate 24b is an axially projecting rim 34 engaging in the annular groove 28. The annular groove 28 is in this case filled with an elastic medium 35, in particular a lubricant, in which the rim 34 engages. The rim 34 is internally of cylindrical design shape and externally of conical design shape. After a certain running-in phase, the consistency of the elastic medium 35 permits a narrow, contact-free sealing gap between the rim 34 on the one hand and the elastic medium 35 on the other. This ensures an optimum sealing effect and the generation of any detrimental heat is avoided. The interaction of the rim 34 in conjunction with the elastic medium 35 permits the formation of a seal labyrinth 36, which advantageously ensures a good sealing property.

Figure 3:
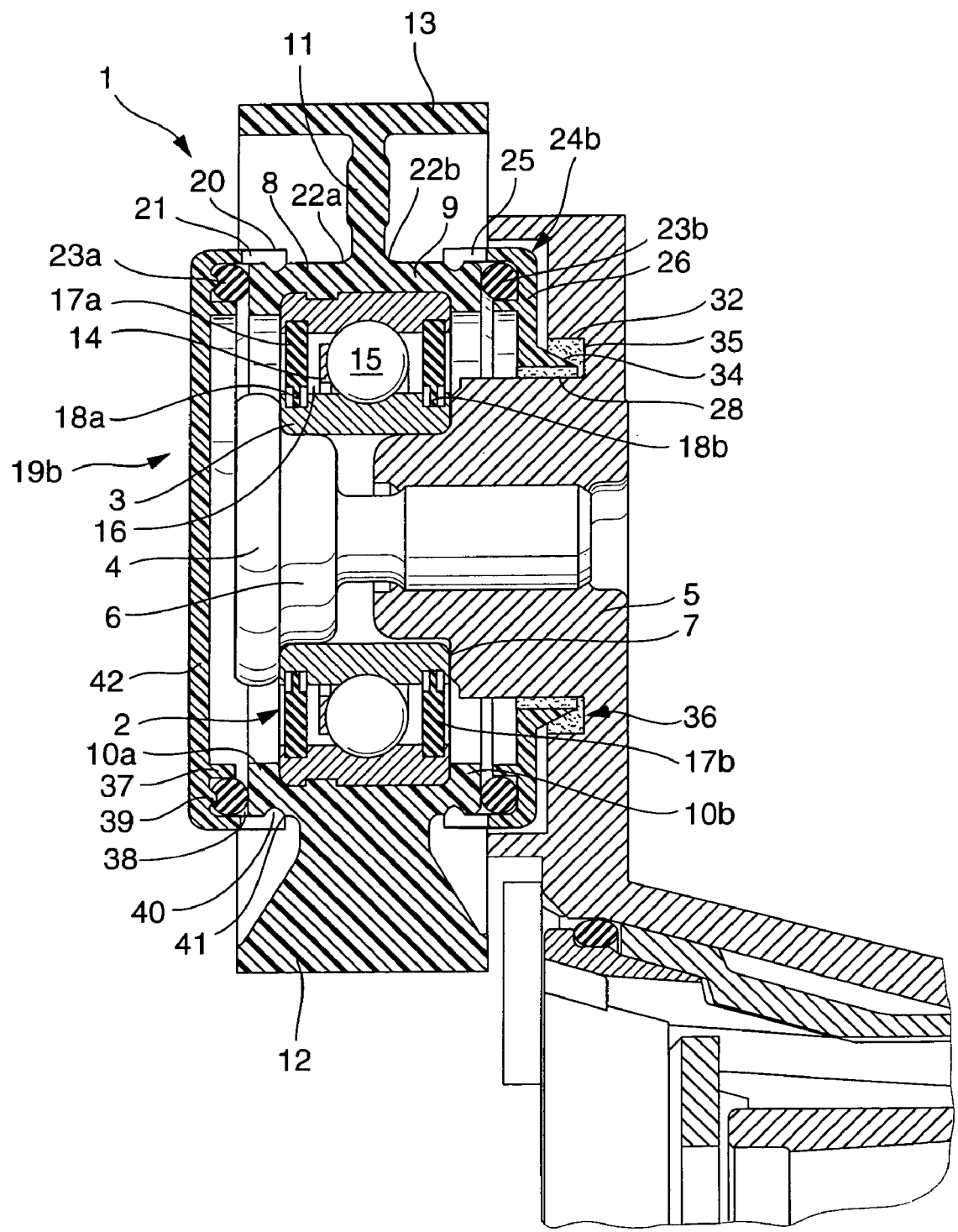
FIG. 3 shows a sealing cap design, in which an elastic seal inserted between the hub and sealing cap is inserted in a fitting space radially defined by the rim and a step.

FIG. 3 depicts the sealing cap 19b of the pulley 1, the cap serving for improved positioning of the seal 23a. The sealing cap 19b defines a fitting space 38 for the seal 23a, which is defined externally by the rim 20 and radially inwards by a step 37. The rim 20 in conjunction with an inwardly offset step 37 originating from a base 42 radially defines the fitting space 38 for the seal 23a. By virtue of a small contact area, an axially projecting spur 39 originating from the base 42 of the sealing cap 19b in the area of the fitting space 38 engages locally in the seal 23a and even in unfavorable tolerance situations between the hub 9 and the sealing cap 19b permits an optimal, adequate sealing effect between the hub 9 and the sealing cap 19b.

FIG. 3 further shows a positively interlocking connection of the sealing cap 19b to the hub 9. For this purpose the rim 20 of the sealing cap 19b is internally provided with a circumferential bead 40, which when the sealing cap 19b is fitted positively interlocks in an annular groove 41 associated with the cylindrical step 22a of the hub 9. These measures for achieving an improved sealing property by means of the axial spur 39 and for fixing the sealing cap 19b to the hub 9 by means of the radial bead 40 are, as represented in FIG. 3, directly transferable to the sealing plate 24b.

REFERENCE NUMERALS

1 Pulley
2 Roller bearing
3 Bearing ring
4 Threaded connection
5 Housing
6 Centering spigot
7 Shoulder
8 Bearing ring
9 Hub
10a Shoulder
10b Shoulder
11 Central wall
12 Member
13 Rotating disc
14 Cage
15 Rolling element
16 Internal space
17a Seal
17b Seal
18a Seal lip
18b Seal lip
19a Sealing cap
19b Sealing cap
20 Rim
21 Slot
22a Step
22b Step
23a Seal
23b Seal
24a Sealing plate
24b Sealing plate
25 Rim
26 Flank
27 Section
28 Annular gap
29 Seal
30 Seal lip
31 Bead
32 Annular groove
33 Outer wall
34 Rim
35 Medium (elastic)
36 Seal labyrinth
37 Step
38 Fitting space
39 Spur
40 Bead
41 Annular groove
42 Base

The invention claimed is:

1. A seal for a roller bearing, the seal comprising a sealing plate which is externally fixed to a rotating hub enclosing the roller bearing and which internally interacts with a rotationally fixed housing, on which an inner bearing ring of the roller bearing is positioned, wherein the sealing plate is fixed at least with a positive interlock to the hub, a separate sealing medium being provided between the sealing plate and the hub, and the sealing plate being internally tightly connected by means of an elastic seal or an elastic medium to the housing, at least a bracing force of the elastic seal being reduced as the rotational speed of the roller bearing increases.

2. The seal as claimed in claim 1 further comprising: a first seal inserted directly between the inner bearing ring and the outer bearing ring of the roller bearing forming a two-stage seal.

3. The seal as claimed in claim 1 wherein the sealing plate, at least in parts, has an externally axially projecting rim, the rim serving to fix the sealing plate to the hub by means of force-locking.

4. The seal as claimed in claim 3, wherein the rim has at least one bead facing radially inwards, which when fitted snaps positively into an associated annular groove in the hub.

5. The seal as claimed in claim 1, wherein the separate sealing medium is an elastic seal between the hub and a radial flank of the sealing plate.

6. The seal as claimed in claim 5, wherein the elastic seal is an O-ring or a circular rubber ring.

7. The seal as claimed in claim 5, wherein the elastic seal is arranged in a fitting space or accommodation for the sealing plate defined radially outwards by the rim and radially inwards by an axially projecting step.

8. The seal as claimed in claim 7, wherein the elastic seal is supported on a circumferential spur arranged on the rim side and projecting axially into the fitting space.

9. The seal as claimed in claim 1, wherein the sealing plate is made from a plastic material.

10. The seal as claimed in claim 1, wherein with the sealing plate fitted to the hub, the elastic seal is supported by an axially aligned seal lip on a cylindrical section of the housing, forming a seal.

11. The seal as claimed in claim 10, wherein the seal lip of the elastic seal at the end has an outward facing bead, which is arranged so that a centrifugal force acting at the center of mass of the bead gives rise to a component force acting clockwise or counterclockwise, depending on the fitted position of the seal lip, and reducing the bracing force of the seal lip.

12. The seal as claimed in claim 11, wherein the seal lip of the elastic seal engages in an axial annular groove of the housing, a radial outer wall of the annular groove limiting a displacement of the seal lip due to the centrifugal force.

13. The seal as claimed in claim 11, the elastic seal joined to the elastic seal lip is molded onto a radially inward facing flank of the sealing plate or is snapped onto the flank forming a positive interlock.

14. The seal as claimed in claim 1, wherein the sealing plate comprises a radially inward facing flank proximately about a cylindrical section of the housing and sized to maintain an annular gap between the flank and the cylindrical section, the gap being filled by an elastic medium (35).

15. The seal as claimed in claim 14 wherein a lubricant is introduced into the annular gap or the annular groove as elastic medium.

16. The seal as claimed in claim 1, wherein the sealing plate comprises a radially inward facing flank having an outward end and an inward end, the inward end being bent at a right-angle and forming an axially projecting rim, which engages with some free play in an annular groove in the housing.

17. The seal as claimed in claim 16, wherein the axially projecting, cylindrical rim of the sealing plate engages in the annular groove filled with a lubricant.

18. The seal as claimed in claim 17, wherein the elastic medium in conjunction with the rim of the sealing plate forms a seal labyrinth.

19. The seal as claimed in claim 16, wherein the rim of the sealing plate is internally of cylindrical design shape and externally of conical design shape.

20. A seal for a roller bearing, the seal comprising a sealing cap of cup-shaped design, which is assigned to a hub externally enclosing the roller bearing and which covers the front face of the roller bearing wherein the sealing cap, at least in parts, has an externally axially projecting rim, the rim serving to fix the sealing cap both by positive interlock and by force-locking to the hub, a separate elastic sealing medium being used in a fitting space between the hub and the rim of the sealing cap on the front face of the roller bearing, an axial accommodation between the sealing cap and the hub.

21. The seal as claimed in claim 20 further comprising: a first seal inserted directly between the inner bearing ring and the outer bearing ring of the roller bearing forming a two-stage seal.

22. The seal as claimed in claim 20, wherein the rim has at least one bead facing radially inwards, which when fitted snaps positively into an associated annular groove in the hub.

23. The seal as claimed in claim 20, wherein the separate elastic sealing medium is an O-ring or a circular rubber ring.

24. The seal as claimed in claim 20, wherein the separate elastic sealing medium is arranged in a fitting space or accommodation for the sealing cap defined radially outwards by the rim and radially inwards by an axially projecting step.

25. The seal as claimed in claim 24, wherein the separate elastic sealing medium is supported on a circumferential spur arranged on the rim side and projecting axially into the fitting space.

26. The seal as claimed in claim 20, wherein the sealing cap is made from a plastic material.

* * * * *